J. G. HALSEY.
Egg-Tester.
No. 218,435. Patented Aug. 12, 1879.
FIG. 1.
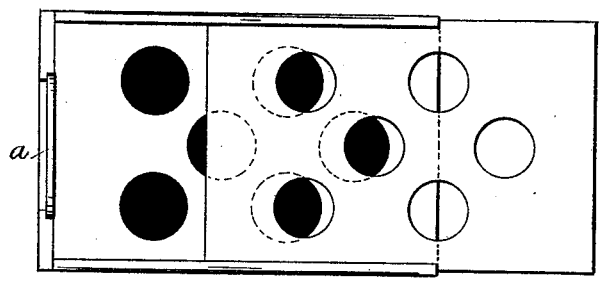 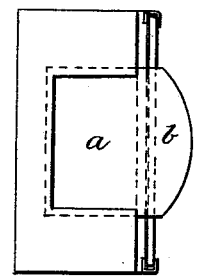
FIG. 2.  FIG. 4.
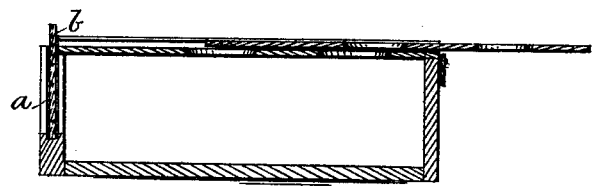 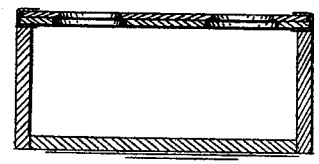
FIG. 3.  FIG. 5.
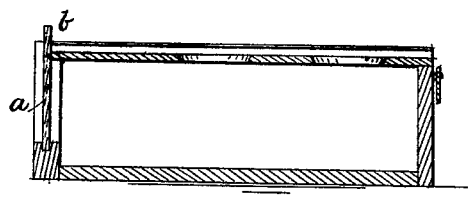 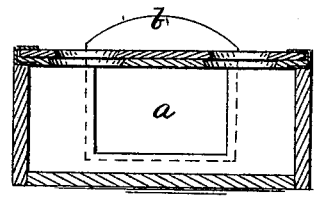
Witnesses:
D. P. Cowl
L. Bacon
Inventor
Jonathan G. Halsey
by J. R. Nottingham
Atty.

UNITED STATES PATENT OFFICE.

JONATHAN G. HALSEY, OF ITHACA, NEW YORK.

IMPROVEMENT IN EGG-TESTERS.

Specification forming part of Letters Patent No. 218,435, dated August 12, 1879; application filed June 20, 1879.

*To all whom it may concern:*

Be it known that I, JONATHAN G. HALSEY, of Ithaca, in the county of Tompkins and State of New York, have invented a new and useful Improvement in Egg-Testers, of which the following is a description and specification.

The invention relates to a means of inexpensively and expeditiously testing eggs.

Heretofore boxes similar to mine, of oblong, square, and cylindrical form, have been used for testing eggs; but each and every one of such, in their construction, so far as I know, have been equipped with appendages such as lenses, tubes, looking-glass plates, or other devices, all more or less objectionable, on account of the time required to handle a quantity of eggs, as also on account of the expense of construction, and also on account of the uncertainty of discriminating good from addled and other refuse eggs on murky days or by artificial light.

My invention obviates and overcomes the matters and difficulties mentioned, and consists in making a box of uniform depth—say about two inches—from metal, wood, junk, straw-board, or paper, in form round, square, or oblong, (the latter is preferable,) the cover having apertures arranged in diagonal form or otherwise, and of size sufficient to admit eggs to stand endwise therein and their lower ends to extend down below the cover or sustaining-board, so as to be clearly seen when looking into the interior through the small opening in the end to be mentioned.

The ends and sides of my tester-box are thoroughly closed, except a small opening at one end, which opening is designed to permit the eggs to be examined when placed in position as described in the paragraph above.

My egg-tester box is of that class which may be used advantageously to exhibit eggs by filling the apertures, and placing it and them on exhibition. Therefore, to protect the inside of the box from dust when so exposed, I use a glass to cover the end opening mentioned.

In my arrangement I overcome the necessity of using lenses or tubes or looking-glass plates, or any artificial reflector connected with the box, for the reason that I make the inside a very dark color or black, (black is preferable,) thus making the interior opaque, or nearly so, when the apertures in the cover or sustaining-board are closed. Therefore it is that when these apertures are filled with eggs a strong light, whether artificial or natural, passes through the sound and good eggs, as seen from the small opening in the end mentioned. At the same time the examiner can at once detect addled or otherwise unsound eggs, if any such are among those subject to his scrutiny.

In constructing covers for holding the eggs in position for examination I make them with apertures of different sizes, therefore adapted to the testing of eggs differing in size, and the tester-box is so arranged in reference to this (which is very essential) that without expense, and comparatively without loss of time, one of these holders or covers can be slid over and substituted for the other.

My arrangement is practical to test one egg or one hundred at one and the same time—*i. e.*, by covering any unfilled apertures the egg or eggs filling the others show the same as if all the apertures were filled with eggs.

In the accompanying drawings, Figure 1 is a top view of my tester-box, showing two holders or covers, one having large apertures below, and one having smaller apertures resting upon it, the latter slid in the side grooves loosely, as others may be if required. Figs. 2 and 3 are longitudinal sections of the same tester-box cut in two equal parts, showing the bottom, with the side elevations and the grooves in which the extra egg holders or covers slide in and out, as mentioned. Figs. 4 and 5 are end sections of the same box.

Letter *a* in Fig. 5 represents the small opening at the end, and letter *b* represents the glass protecting or covering the same.

I recommend the glass to be used, as it is not only essential as protecting the interior of the box from dust, as stated, but it increases the opaque character of the same.

Having thus described my invention, I do not claim, broadly, a box having a cover perforated with apertures for holding eggs, for such covers have been used before.

What I claim is—

An egg-tester whose interior is blackened, having an inspection-opening glazed, and also having a rigid lower and one or more movable upper covers perforated with holes of different diameters, the lower having large and the upper smaller perforations, for admission of large or small eggs.

JONATHAN G. HALSEY.

Witnesses:
WILLIAM HALSEY,
H. HOWARD.